May 14, 1963 W. S. PARKER ET AL 3,089,556
WEIGHING APPARATUS
Filed May 13, 1960
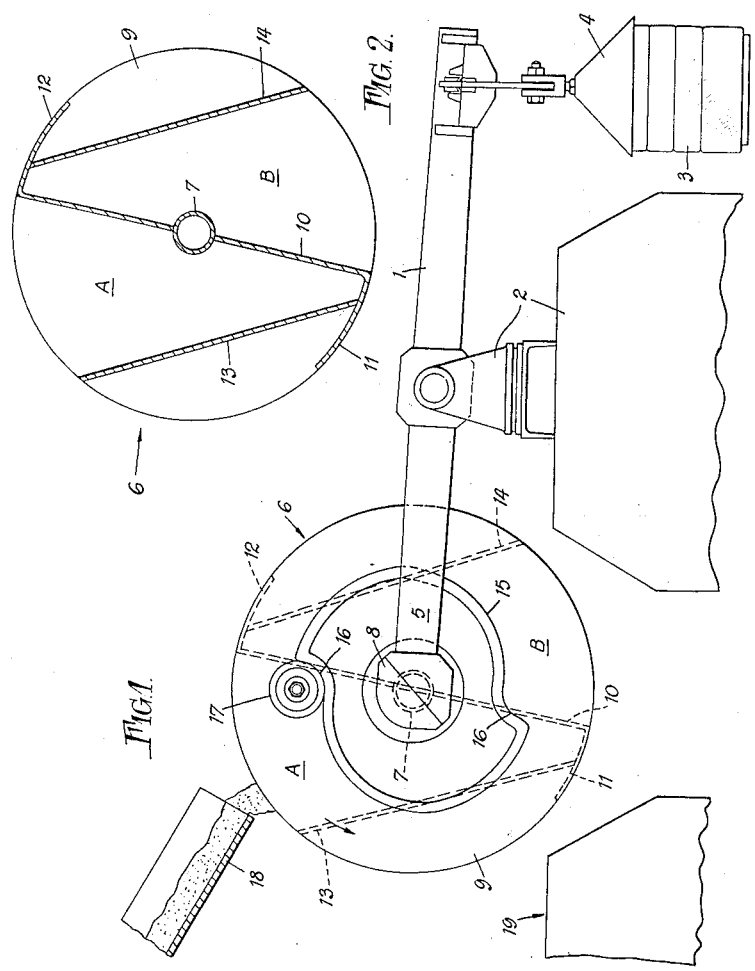

3,089,556
WEIGHING APPARATUS
William Sym Parker and James Norman Fox, Barrow-in-Furness, England, assignors to Vickers-Armstrongs (Engineers) Limited, London, England, a British company
Filed May 13, 1960, Ser. No. 29,082
Claims priority, application Great Britain May 14, 1959
1 Claim. (Cl. 177—86)

This invention relates to weighing apparatus.

According to the present invention there is provided apparatus for weighing loose material such as cement clinker, the apparatus comprising a drum rotatable about a substantially horizontal axis and having a plurality of compartments which open towards the periphery of said drum, means responsive to the weight of the drum and its contents, and indexing means for controlling rotation of said drum, the arrangement being such that upon a stream of the material to be weighed being caused to flow into an upright one of said compartments and upon the quantity of material in said one compartment reaching a predetermined amount, said weight responsive means causes said indexing means to allow the drum to rotate under the influence of the load of material in said one compartment so that said one compartment becomes inverted and the material is discharged therefrom, a further compartment becoming aligned with the stream of material and the indexing means maintaining the drum in its new angular position until the predetermined amount of material has flowed into said further compartment.

For a better understanding of the invention, and to show how the same may be carried into effect, reference will now be made to the accompanying drawing, in which:

FIGURE 1 is an elevational view of a weighing apparatus, and

FIGURE 2 is a sectional view of a part of the apparatus of FIGURE 1.

The weighing apparatus shown has a weigh beam 1 which is centrally pivoted upon a base member 2. One end of the weigh beam 1 carries balance weights 3 and a cover 4 whilst the other end of the beam has two parallel arms 5 the free ends of which carry a rotatable drum 6. The axis of the drum 6 is horizontal and parallel to the pivotal axis of the weigh beam 1. The drum 6 has a central spindle 7 which is rotatably mounted in self-aligning roller bearings contained in split housings 8 carried at the free ends of the arms 5. The drum includes two discs 9, the discs 9, which are spaced apart along the axis of the spindle 7, forming the end walls of the drum 6. A plate 10 disposed diametrically of the drum 6 extends between the end walls. Arcuate plates 11 and 12 extend in opposite directions from opposite edges of the plate 10. Each of the arcuate plates 11 and 12 extends from one end wall of the drum to the other and is aligned with the peripheries of the discs 9 forming the end walls. The arcuate plates 11 and 12 each subtend an angle of about 30° at the centre of the drum. Two flat parallel plates 13 and 14 have their opposite ends secured to the discs 9. As will be seen from FIGURE 2 one edge of the plate 14 is fixed to the plate 12 and one edge of the plate 13 to the plate 11. The free edge of each plate 13 and 14 registers with the peripheries of the discs 9. The plates 13 and 14 are oblique to the diametral plate 10 and in section the plates 13 and 14 and the diametral plate 10 approximately form a letter Z.

When the plate 10 is approximately vertical, that is in the position shown in FIGURE 1, the plate 10 together with the plate 13, the two discs 9 and the portion of the plate 11 between the plates 10 and 13 form an upright open-topped V-section compartment A whilst the plate 13 and the portion of the plate 11 on the side of the plate 13 remote from the plate 10 form a scoop or subsidiary compartment. Similarly, the plate 10, the plate 14, the portion of the plate 12 between the plates 10 and 14 and the discs 9 form an inverted V-section compartment B which is open at the bottom whilst the plate 14 cooperates with the portion of the plate 12 on the side of the plate 13 remote from the plate 10 to form an inverted scoop or subsidiary compartment.

An indexing cam 15 is secured to the drum spindle 7. The cam 15 is in the form of two semi-circles which have been formed from the same circle and displaced one relative to the other along a common diameter thereby to form two shoulders 16. The spindle 7 is secured to the cam 15 at a location mid-way between the shoulders 16, the shoulders 16 being aligned approximately with the diametrical plate 10. Provision is made for adjusting the cam 15 angularly of the drum 6. A roller type cam follower 17 is mounted on a bracket (not shown) supported from the base member 2.

In use of the weighing apparatus described above the drum 6 is positioned with its open-topped V-section compartment A immediately below the free end of a chute 18 which discharges the material to be weighed. The material may be cement clinker as produced from a rotary kiln or similar dry products which are produced continuously. Suitable balance weights 3 are placed on the end of the weigh beam to compensate for the weight of the drum 6, cam 15 and bearings. An additional weight is added to control the level to which the compartment A is filled. Material is then allowed to flow from the chute 18 to the open-topped compartment A. With continued filling of the compartment the apparatus eventually becomes out of balance. The beam 1 tilts and the roller follower 17 becomes disengaged from the upper one of the shoulders 16 of the cam 15. Under the influence of the material in the filled compartment A the drum 6 turns about its axis and the contents of the compartment A are discharged into a suitable container 19. After discharge the surface of the cam 15 is maintained in contact with the follower 17 by the restoring moment on the weigh beam 1 due to said additional weight. The apparatus is so designed having regard to the inertia of the rotating parts, the shape and size of the two V-section compartments and the magnitude of said additional weight that after discharge has been effected, the drum 6 continues to rotate with decreasing angular velocity until the other of the shoulders 16 of the cam 15 makes contact with the follower 17. By this time the drum 6 will have rotated 180° and the V-section compartment B will now be upright and in the position in which it can be filled with material. During the period of rotation of the drum 6 the material continues to be directed upon the drum 6 from the chute 18 and such material is collected in the scoop adjacent the compartment B which is moving towards its upright position. The material in the scoop is weighed together with the main body of material collected in the upright compartment and is discharged into the container 19 at the same time as the material is discharged from the compartment.

The total quantity of material which has flowed from the chute is recorded on a revolution counter (not shown) connected to the drum spindle 7 and calibrated in tons.

We claim:

Apparatus for weighing loose material such as cement clinker, comprising a drum rotatable about a horizontal axis, means supporting the drum for substantially vertical movement, means for urging the drum to an upper position and for allowing the drum to be displaced downwardly when the weight of the drum and contents exceeds a predetermined amount, first and second discs spaced along said axis to form the ends of the drum, a first plate having opposite edges thereof connected to said discs, the plane of the first plate passing through said axis, a second plate disposed on one side of and at an acute angle to said first plate and connected to the first and second discs and the first plate for defining therewith a first compartment, a third plate disposed on the other side of the first plate substantially parallel to the second plate and connected to said first and second discs and the first plate to define therewith a second compartment, said compartments each having an opening adjacent the periphery of the drum for receiving loose material to be weighed when the associated compartment is in an upright position and for discharging the material when the compartment is inverted, the compartments being shaped so that filling either of them when upright tends to rotate the drum in one direction so that said one compartment becomes inverted, a fourth plate connected to the first and second discs and positioned on the side of the second plate remote from the first plate and at a part of the second plate adjacent the connection of the second plate with the first plate to define with the discs and the second plate a first scoop associated with the first compartment for receiving material directed onto the drum during rotation of the drum in said one direction which brings said first compartment to an upright position, a fifth plate connected to the first and second discs and positioned on the side of the third plate remote from the first plate and at a part of the third plate adjacent the connection of the third plate with the first plate to define with the discs and the third plate a second scoop associated with the second compartment for receiving material directed onto the drum during rotation of the drum which brings said second compartment to an upright position, and indexing means for holding the drum against rotation solely when the drum is in said upper position with one of said compartments upright and for permitting rotation of the drum when the latter is displaced downwardly.

References Cited in the file of this patent

UNITED STATES PATENTS

| | | |
|---|---|---|
| 618,129 | Outcalt et al. | Jan. 24, 1899 |
| 744,420 | Smail | Nov. 17, 1903 |
| 975,158 | Richardson | Nov. 8, 1910 |
| 2,772,818 | McLauchlan | Dec. 4, 1956 |

FOREIGN PATENTS

| | | |
|---|---|---|
| 356,451 | Germany | July 22, 1922 |